United States Patent [19]

Turek

[11] 3,943,214

[45] Mar. 9, 1976

[54] METHOD IMPROVEMENTS FOR CONTROLLING PARISON LENGTH

[75] Inventor: Michael H. Turek, Ledyard, Conn.

[73] Assignee: Monsanto Company, St. Louis, Mo.

[22] Filed: Aug. 8, 1974

[21] Appl. No.: 495,627

[52] U.S. Cl. .................. 264/40; 264/99; 425/140; 425/150; 425/DIG. 231
[51] Int. Cl.² ........................................ B29C 17/07
[58] Field of Search ... 264/40, 89, 98, 99, 148–151; 425/150, 140, 326 B, 387 B, 342, DIG. 206, 211, 231

[56] References Cited
UNITED STATES PATENTS

| | | | |
|---|---|---|---|
| 2,750,624 | 6/1956 | Coates et al. | 264/99 |
| 2,854,691 | 10/1958 | Strong | 425/139 |
| 2,928,120 | 3/1960 | Leghorn et al. | 264/98 |
| 2,952,034 | 9/1960 | Fortner | 264/99 |
| 3,002,615 | 10/1961 | Lemelson | 207/2 |
| 3,759,648 | 9/1973 | Hunkar | 264/40 X |
| 3,795,719 | 3/1974 | Morecroft et al. | 264/40 |

Primary Examiner—Jan H. Silbaugh
Attorney, Agent, or Firm—Michael J. Murphy

[57] ABSTRACT

Method for controlling the length of parison portions available for blow molding which includes use of a carrier supporting a plurality of blow molds, a drive train for the carrier to consecutively position such molds beneath an extruder head and a logic module responsive to a control signal for regulating the length of parison portions protruding beyond the cavity of successively presented molds, the improvement which includes use of variable speed means responsive to such signal for changing the speed of movement of the carrier to vary the rate at which consecutive molds are presented to the head. The method involves varying the speed of movement of the carrier in response to such signal to thereby vary the rate at which molds are presented for receiving consecutive parison portions, and therefore the amount of the length of each such parison portion available to protrude beyond the cavity of a mold.

4 Claims, 4 Drawing Figures

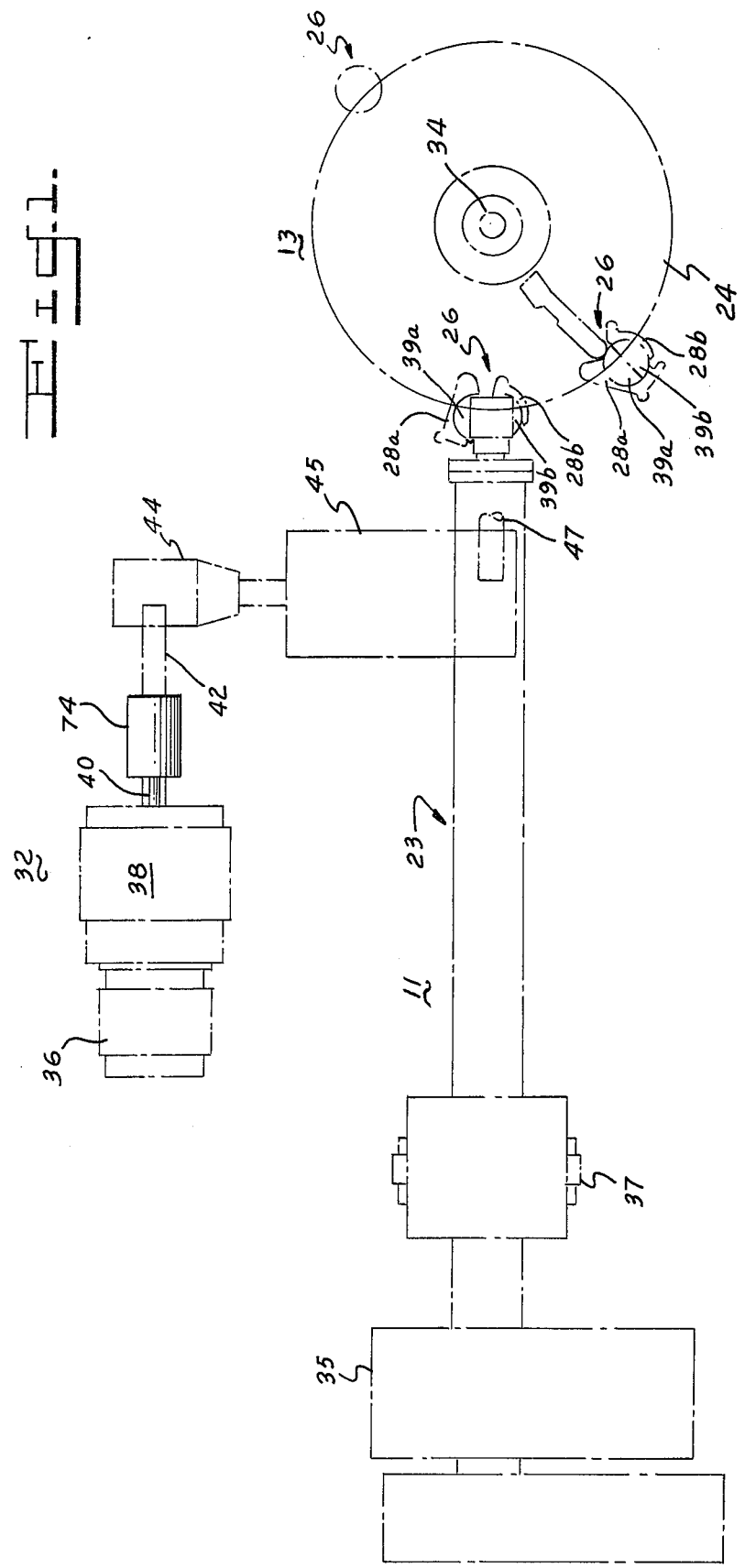

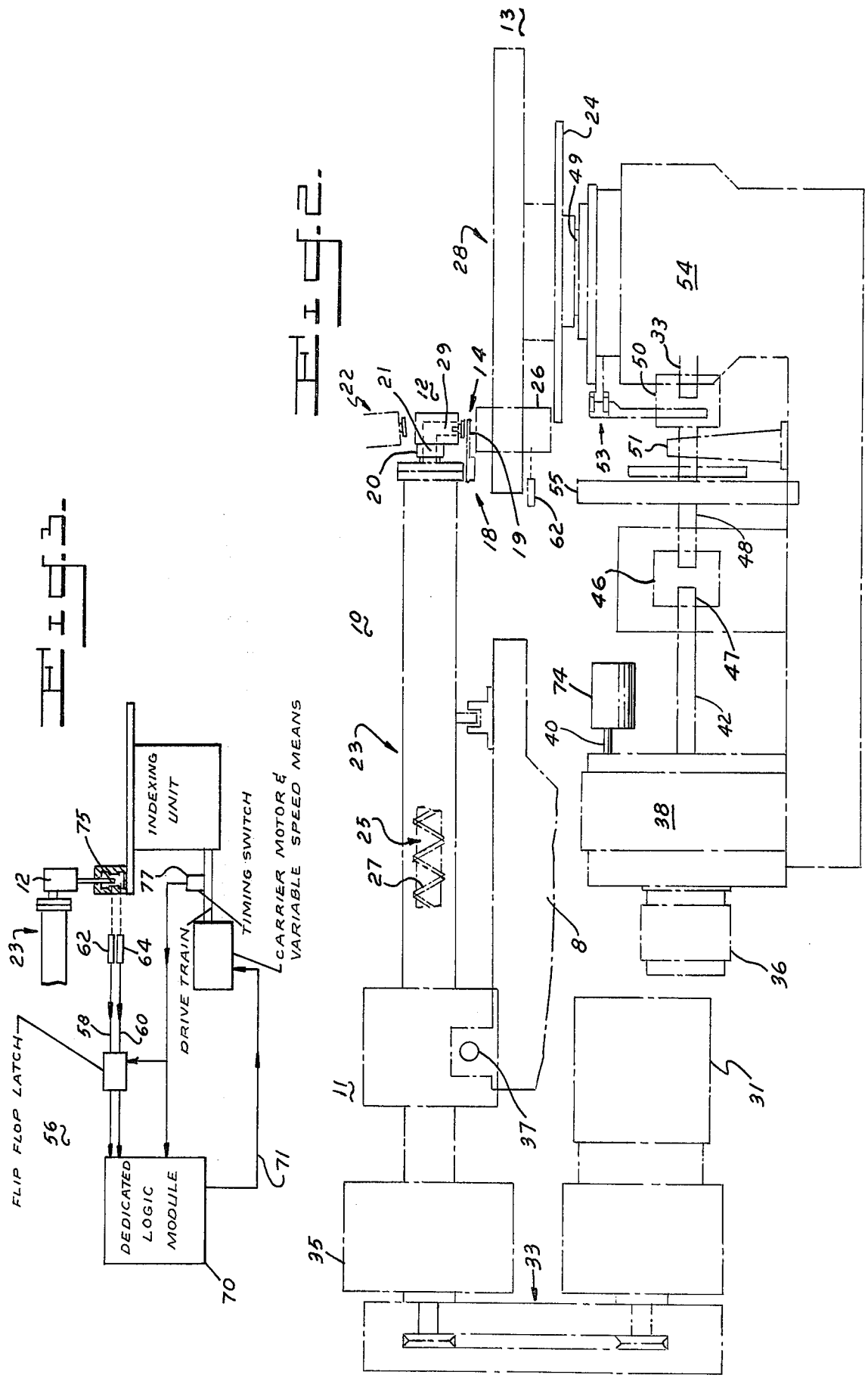

METHOD IMPROVEMENTS FOR CONTROLLING PARISON LENGTH

BACKGROUND OF THE INVENTION

This invention relates to blow molding and particularly to equalizing the length of successive hollow thermoplastic parison portions consecutively received between closing sections of a series of adjacent blow molds in a continuously cycling system.

In blow molding hollow articles such as containers by closing sections of a partible mold on successive lengths of a hollow parison issuing from an annular orifice in an extruder head, a waste "tail" portion is formed which must be removed before the article can be considered to be in finished form. Such tail represents the portion of the tubular parison squeezed into a web configuration between the mold sections during closing which extends beyond the cavity defining the surface configuration of the hollow article, and is well known in the art as necessary primarily to ensure the presence of sufficient material to form the end wall of the article being blow in the mold.

The length of such tail protruding beyond the cavity in a continuously operating blow molding system will vary from mold to mold for a variety of reasons. For example, successive lots of polymer may have slightly different rheological properties which can result in different melt flow behavior in the extrusion system. Changes in the ratio of recycled regrind to virgin material can also produce rheological variations in the resultant mixture. When programming the wall thickness of the extruding parison to optimize distribution in the subsequently blown container, different patterns of flow of the plastic between the parison-forming surfaces will occur if the movable die surface of the orifice is not repositioned exactly in successive cycles. As the maximum capacity of the extrusion system supplying the molding machine is approached, (such condition being desirable to minimize molded part cost in a high volume system) surge of the output at the orifice can occur which magnifies variability.

Such variability in tail length can cause serious processing problems. For example, if the mold is closed without forming any tail at all, the free end of the parison will not be pinched shut and the too short length cannot be blown at all. If a tail is formed but is real short, downstream tail removal equipment set to accommodate a particular range of lengths may fail to pick it up and the article can go through the system untrimmed. On the other hand, if the tail is too long, the mold sections may be unable to close tightly on each other, or preset downstream tail-removal and article handling equipment may jam, either of such conditions undesirably requiring shut down of the overall production line. When employing thickness programming as previously described, as tail length varies the program pattern will wander in the direction of variance and therefore optimum wall distribution will not be attainable during subsequent blowing.

U.S. Pat. No. 3,759,648 discloses a system for controlling tail length which involves changing the speed of rotation of the extruder screw in accordance with whether the sensed extruded length of parison below the outlet of the extruder head is too long or too short. When screw speed is varied, however, the rheological properties of the thermoplastic polymer in the extruder are also changed. For example, increasing or decreasing rotary or axial movement of the screw will correspondingly cause the temperature and therefore the viscosity of the polymer melt to go up or down because of the change in energy input. As a consequence, such a control system tends to be constantly hunting to correct its own introduction of instability.

SUMMARY OF THE INVENTION

Now, however, improvements have been developed in controlling tail length in an extrusion-blow molding system which avoid these prior art difficulties in that such length can be varied without causing a disturbance in the rheological properties of the thermoplastic material forming the parison.

Accordingly, it is a principal object of this invention to provide method improvements in controlling tail length in an extrusion-blow molding system.

An additional object of this invention is to provide such improvements without changing extruder screw speed, but rather by correlating tail length with molding machine speed.

A further object of this invention is to provide such improvements which are free of any interaction with other polymer processing parameters.

A particular object of this invention is to provide method improvements in controlling tail length in an extrusion-blow molding system which react to the already-formed parison while it is still substantially attached to the remainder of the material in the extruder head.

A specific object of this invention is to provide such improvements in using blow molding apparatus of the type utilizing a horizontally oriented carrier mounted for movement about a vertical axis to bring a series of molds supported thereon into consecutive parison-loading position beneath the head.

Other objects of this invention will in part be obvious and will in part appear hereinafter from the following disclosure and claims.

These and other objects are accomplished in using blow molding apparatus which includes a downwardly directed extrusion head having a vertically disposed annular orifice for shaping a freely pendant hollow thermoplastic parison therein, a carrier supporting a plurality of molds adjacent the head, drive means to move the carrier to consecutively position such molds beneath the head to receive portions of such parison for blow molding therein, means responsive to a control signal for regulating the length of a parison section protruding beyond the cavity of successively presented molds, and means either in or adjacent the orifice for severing the parison, by providing the improvement in said apparatus whereby the amount of said length of varied without causing a related change in the rheological properties of the thermoplastic forming the parison, which improvement comprises, in combination, variable speed means for the drive means responsive to the control signal for changing the speed of said carrier to vary the rate at which consecutive molds are present beneath the head.

From a method standpoint, the invention involves varying the speed of the carrier in response to the signal to vary the rate at which the molds receive consecutive parison portions and therefore the amount of the length of each parison portion protruding beyond the cavity portions thereof.

BRIEF DESCRIPTION OF THE DRAWINGS

In describing the overall invention, reference will be made to accompanying drawings wherein:

FIGS. 1 and 2 are schematic plan and elevational views respectively in outline form of portions of a type of extrusion-blow molding apparatus in which the improvements of the invention are particularly applicable;

FIG. 3 is a schematic view illustrating the control system of the invention in reduced, block form.

DETAILED DESCRIPTION OF THE ILLUSTRATED EMBODIMENT

Figure 4:
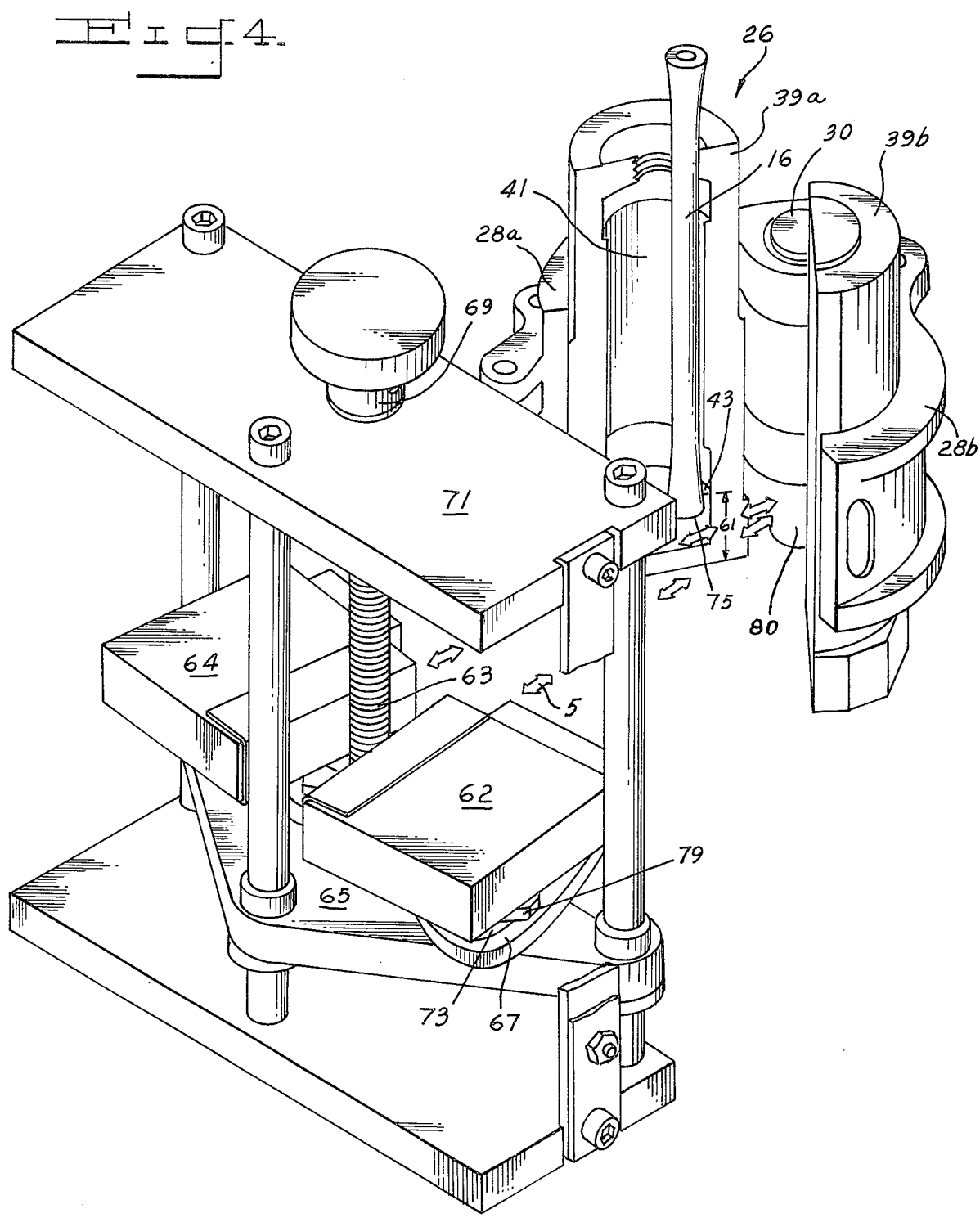
FIG. 4 is an enlarged perspective view of the parison length sensing portion of the apparatus of the invention.

Referring now to the drawings there is shown in FIGS. 1 and 2 an extrusion-blow molding assembly, designated in its entirety (FIG. 2) as 10. Assembly 10 includes extrusion apparatus 11 comprising downwardly directed (FIG. 2) extrusion head 12 having vertically disposed annular outlet orifice 14 at its lower end for conventionally forming a freely pendant, hollow thermoplastic parison 16 (FIG. 4) therein between spaced adjacent inner and outer annular surfaces. Knife means, generally indicated as 18, includes blade 19 having a sharp edge for severing the trailing end of parison 16 at orifice 14 at that point in the molding cycle when a sufficient length of parison 16 to mold an article has been formed between the surfaces defining orifice 14. In the particular embodiment illustrated, knife means 18 are shown between molds 26 and orifice 14 and blade 19 is pivoted at one end for slidable reciprocation across and in a plane generally perpendicular to the surfaces defining orifice 14 at the proper point in the cycle by a suitable conventional actuator, not shown. Alternative types of parison severing systems can be used and a preferred version integral in the head uses a downwardly reciprocated inner mandrel tip momentarily striking the outer surface-defining portion of the orifice to partially penetrate the plastic which is then fully severed at the orifice by the upward movement of the head away from a just-closed subjacent mold.

Head 12 is in continuous communication via an internal passage shown dotted at 21 in delivery tube 20 with a conventional extruder 23 employing a screw 25 mounted for rotation within a casihg and having flights 27 for advancing the thermoplastic material toward and through vertical passage 29 and orifice 14 in head 12. Screw 25 in the illustrated embodimend is rotated via a separate extruder screw drive assembly which includes, in succession, electric motor 31 anchored on a support plate, not shown, belt drive 33 and gear mechanism 35, the output shaft of the latter being conventionally mechanically coupled to one end of screw 25. Such extruder screw drive assembly and other related parts involved in turning screw 25 are all carried, in the illustrated embodiment, on a carriage shown partially at 8 which pivots about a pair of journaled horizontally spaced stub shafts 37 mounted (FIG. 1) on vertical stanchions on either side of the machine. Though not essential, screw 25 preferably rotates continuously, while extruder 23 pivots about shafts 37, via an actuating system to be described, alternately to an up position illustrated in outline form at 22 (FIG. 2) during indexing movement of a mold into loading position beneath head 12, and then down to the lower position illustrated in fuller lines in FIG. 2 at which latter point the parison portion which had been extruded during upward movement is enclosed within mold sections in a manner to be further described. The overall operation of this general type of system is more completely detailed in U.S. Pat. No. 2,952,034.

Molding apparatus portion 13 of overall assembly 10 includes a carrier such as horizontally positioned, circular table 24 (FIG. 2) supporting a plurality of circularly arranged molds 26 generally subjacent head 12 and equispaced about its periphery, only three being shown in FIG. 1 for purposes of clarity. Molds 26 include cooperating sections 39a, 39b (FIG. 4) conventionally secured within clamps 28a and 28b which are pivoted to each other at 30. Each section 39 is recessed along an inner face to define one half 41 of a cavity having a surface contour conforming to that of the article to be molded therein when the sections are closed on each other. Each recess 41 has an article base-defining surface 43 at one end, with the portion of the parison length protruding beyond such surface 43 which is squeezed shut between wall portions 61 of sections 39 during mold closing representing the tail portion of the parison with which the present invention is concerned.

Drive means, generally indicated as 32 (FIG. 1), moves carrier 24 in a horizontal plane about vertical axis 34 and, in the illustrated embodiment, comprises mechanically coupled members which include, in succession, conventional electric motor 36, variable speed drive unit 38 having speed control shaft 40 and power output shaft 42 below it, right angle drive unit 44 and gear reduction unit 45. Output shaft 47 of unit 45 is conventionally secured via a coupling 46 to intermediate driven shaft 48 (FIG. 2) rotatably journaled in pillow block 51 and which has its output end secured via flexible coupling 50 to input shaft 33 of right angle indexing unit 54 having vertical output shaft 49 secured to a hub on the underside of carrier 24. Indexing unit 54 is of industrial design and generally includes a series of mechanically operated cams and followers within a casing, whereby for each revolution of input shaft 33 there is a preselected proportional angular rotation of output shaft 49 followed by a dwell or operating interval when output shaft 49 is stationary and no power is transmitted forward to carrier 24. During such dwell period, mold sections 39 of a particular mold 26 come together on the parison portion to be molded therein. In addition, extruder head lift cam shown generally at 55 attached to a lever (not shown) plus a mold open-close linkage 53 are provided in order respectively to vertically raise and lower the extruder and head and open and close the molds at the proper point in the molding cycle, based on rotary power supplied by drive means 32.

As can be recognized, drive means 32 imparts rotation to carrier or table 24 which thereby consecutively positions molds 26 secured thereon beneath and in operative synchronism with the outlet orifice 14 of bobbing extruder head 12 in the manner schematically illustrated in FIG. 3, to receive portions of continuously extruding parison 16 for blow molding therein. Various additional functions are conventionally carried out in timed sequence during each molding cycle in overall assembly 10 in known manner by other components, not shown. Such additional functions may include wall thickness programming, blow air supply to and venting from each mold, blow head movement into and out of registry with each mold, article takeout mechanism movement etc. Such functions are conventional and the manner in which they are timed in synchronism with each other is described in U.S. Pat. No. 2,952,034.

Referring now to FIGS. 3 and 4, means generally indicated as 56 is shown which is responsive to a control signal via lines 58 and 60 from condition-responsive length detection means below head 12, such as a pair of adjacent, industrially available, retro-reflective photocells 62 and 64 (FIG. 4), plus a special retrodirective surface indicated as 80, for reflecting the beams incident thereon from cells 62, 64 back to such cells. Cells 62 and 64 are continuously energized, are arranged to sense the presence or absence of the free end of parison 16 and are adjustably mounted with respect to the opposing vertical wall portions 61 of mold sections 39 which extend downwardly of article base-defining cavity surface 43 and between which the parison tail portion is formed during molding. Thus, by turning shaft 63 which is threadably secured in an opening (not shown) in platform 65, the vertical position of the latter and therefore of cells 62, 64 mounted thereon via brackets 67 can be changed. Locknut 69 on shaft 63 secures such position when tightened against top plate 71. Adjustable positioning in the horizontal plane is achieved via slots 73 in brackets 67 and a suitable threaded bolt and shaft 79, such that each bracket 67 carrying a cell can be independently moved horizontally toward or away from shaft 63. In addition, each cell 62, 64 may be formed with vertical and horizontal slots (not shown) to enable each such cell via conventional threaded bolts and nuts to be vertically and horizontally positioned with respect to the other. In setting such cells, it is preferred that their beams, schematically shown at 5 in FIG. 4, be vertically spaced from each other below surface 43 a distance equal to the allowable variation in the position of end 75 of a parison portion, with the center of such interval being as close as possible to the desired location of such end during consecutive cycles of the system.

In accordance with the present invention, variable speed means exemplarily illustrated in FIG. 1 as servomotor 74, and comprising an electro-mechanical rotary actuator of industrial design, is mechanically secured on speed control shaft 40 of variable speed drive unit 38 of drive means 32. Means 74 is responsive to a signal 71 (FIG. 3) issuing through a regulating circuit from computer or dedicated logic module 70 to either increase, decrease or leave unchanged the rotary speed of the output shaft 42 of drive unit 38 and therefore eventually the rotary speed of input shaft 33 of indexing unit 54. Such change in speed accordingly will vary the rate of indexing movement of carrier 24 and therefore the rate at which molds 26 are consecutively presented beneath head 12 for receiving a parison portion 16.

Through variable speed means 74 is preferably a servomotor for use with a mechanically operable drive unit, alternative types of systems might also be used such as a hydraulic system wherein output is varied by adjusting the position of bypass valves in the hydraulic circuit, or an electronic DC motor control system.

With reference to the remainder of means 56 in FIG. 3 for processing control signals 58, 60 and generating corrective signal 71, reference may be generally made for further details to col. 8, lines 18 through 68, through col. 9, lines 1–17 of U.S. Pat. No. 3,759,648 wherein a similar system is described which can be used in the present invention to regulate variable speed means 74 of drive train 32. In general, such components include a J-K flip-flop latch mechanism, a decision making computer or dedicated logic module and associated logic circuitry. Though dual photocells 62, 64 are preferred for control stability, one unit could be used in the manner described in such just-referenced patent.

In operation, a freely pendant hollow thermoplastic parison portion 16 having an initially unconfined forward end 75 is continuously formed in outlet 14 of head 12 at a constant vertical rate of linear extrusion, (except for those previously described unintentional fluctuations therein which cause the variability toward which the invention is directed). Motor 36 of drive means 32 via the associated intermediate driven members previously described, have positioned a mold 26 beneath head 14 with its cooperating sections 39 fully separated. Head 12 at this point in the cycle is in the down position, mold 26 having been synchronously moved into this loading position beneath it as extruder 23 carrying head 12 was bobbing downwardly about stub shafts 37. While head 12 bobs upwardly to position 22 after a mold 26 has closed on a parison portion 16, intermitter 54 will synchronously forward rotary power to carrier 24 to index the next mold into place beneath head 12 to receive the next parison portion.

As each mold 26 dwells in its loading position below head 12 with its cavity sections 39 separated (FIG. 4) and the forward end 75 of a parison portion 16 is advancing downwardly, a switch 77 (FIG. 3) timed to the indexing table 24 is conventionally actuated so as to register the condition of cells 62 and 64 in the J-K flip-flop mechanism. Switch 77 is actuated preferably just before the mold sections close so that the actual position of end 75 of the parison is as close a possible to the desired position on mold closing. If the condition of the cells are such that the beams of each are simultaneously broken, the parison portion for that particular cycle will be too long. If neither is broken the reverse is true and the parison portion is too short. If the beam of the upper cell is broken and that of the lower cell is not, this condition for the illustrated system means that the length of the parison portion for that cycle is within specified limits and accordingly so also will the tail length be within such limits and no correction is required. When either of the first two conditions exist, the corresponding signal read by computer or logic module 70 causes the latter to issue corrective electrical signal 71 to servomotor 74 which either causes the rotary speed of output shaft 42 of variable speed drive unit 38 to increase or decrease which, as noted, will accordingly change the speed of carrier 24 in the desired direction to compensate for parisons which are too long or too short. This means that if the parison has been sensed as too short, for subsequent cycles the carrier or table speed will be decreased to allow time for extrusion of a longer parison portion 16 before the mold sections close on it. If the parison has been sensed as too long, the speed of movement of carrier 24 is increased to increase the frequency at which a mold 26 appears beneath the head to receive the next parison portion or, described another way, to cut the allowable time for extrusion of a parison portion, and therefore the length of such substantially constant rate extruding parison portion which will protrude beyond the cavity portion of a mold will be reduced.

Member 70 can be rather conventionally equipped with feedback capability whereby the condition of cells 62, 64 are checked after a table speed change signal has issued and if satisfied nothing more is done whereas if they are not satisfied, the system is driven electrically until the logic-introduced set point is met.

As can be recognized, the system just described operates completely independent of the rotary speed of extruder screw 25 which is separately controlled by motor 31, and consequently the system of the invention can be said to react to the parison portion already formed in and hanging from the head independent of any change in rheological properties of the thermoplastic material being advanced by such screw 25 to head 12.

The above description and particularly the drawings are set forth for purposes of illustration only and are not to be taken in a limited sense.

Through the parison length control system of the present invention is preferably used with the extrusion-blow molding system illustrated and described herein, it may be used with alternative types of blow molding machines, such as those wherein the molds reciprocate linearly, e.g. laterally or diagonally, into and out of position beneath the extruder head. Likewise, the carrier supporting the molds whose movement is controlled by the system of the invention may operate in a vertical or substantially vertical plane continuously rotating about a horizontal axis and wherein the molds accept the parison being extruded tangential to the periphery of the carrier, such latter systems being known as "wheel" machines in the industry. It is only necessary to employ some means, such as a reciprocating knife, or an actual part of the closing mold or a reciprocating mandrel in the extrusion head, to sever the trailing end of the parison attached in the head in order to form a freely pendant end which can be detected at the desired point in the cycle by the sensors. Conversely, a parison which is not severed subsequent to or at the time of closing of each mold and which exists in continuous form including substantially connected sections between adjacent molds without any exposed end is unworkable in the present invention.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In a method of blow molding hollow articles which includes:

continuously forming a freely pendant hollow thermoplastic parison in the outlet of an extruder head;

moving a carrier in synchronism with formation of said parison to consecutively position molds supported on said carrier beneath the head to receive portions of said parison for blow molding into said articles in cavity sections therein;

sensing the length of a parison section protruding beyond the cavity of successively presented molds; and generating a control signal in response to said sensing, to regulate and thereby reduce the variability in the amount of said length;

the improvement in said method whereby the amount of such length is regulated without causing a related change in the rheological properties of the thermoplastic forming the parison, which improvement comprises, in combination, the step of:

varying the speed of movement of said carrier in response to said signal to vary the rate at which said molds receive consecutive parison portions and therefore regulate the amount of the length of each parison portion protruding beyond the cavity portions thereof.

2. The method of claim 1 wherein movement of said carrier is in a generally horizontal plane about a vertical axis.

3. The method of claim 2 wherein said movement is intermittent.

4. The method of claim 1 wherein said speed variation includes both increasing and decreasing the rate of carrier movement.

* * * * *